United States Patent Office 2,748,050
Patented May 29, 1956

2,748,050

METHOD OF BONDING USING ADHESIVE COMPOSITIONS COMPRISING MONOMERIC DISUBSTITUTED ETHYLENES

Newton H. Shearer and Harry W. Coover, Jr., Kingsport, Tenn., assignors to Eastman Kodak Company, Rochester, N. Y., a corporation of New Jersey No Drawing. Application February 11, 1954,
Serial No. 409,757

12 Claims. (Cl. 154—140)

This invention relates to adhesive compositions comprising certain 1,1-disubstituted ethylenes.

A large number of adhesive compositions are known to the art. In most cases, however, these adhesive compositions are limited in their application to only a relatively few selected materials; or else the compositions which can be used rather universally require the use of catalysts and excessive heat and pressure to achieve the requisite bonding.

It is an object of this invention to provide new adhesive compositions comprising certain 1,1-disubstituted ethylenes as described herein.

Another object of the invention is to provide new and improved monomeric adhesives which can be stored for prolonged periods of time, and which can be readily employed for bonding a great variety of dissimilar materials, using no catalyst and using temperatures either at room temperature or only slightly above room temperature.

Another object of the invention is to prepare laminated articles strongly bonded together by an adhesive bond comprising a polymerized layer of a monomeric 1,1-disubstituted ethylene as defined herein.

Another object of the invention is to provide a method for adhering similar or dissimilar materials together with a strong and water-resistant bond of polymeric 1,1-disubstituted ethylene polymerized during the bonding operation.

These and other objects of the invention are attained by bonding together solid materials with an adhesive composition comprising a monomer of the formula $$CH_2=CXY$$

wherein X is a member of the group consisting of —SO₂R and —SO₃R radicals and Y is a member of the group consisting of —CN, —COOR, —COCH₃, —SO₂R and —SO₃R radicals, R being an alkyl group of from 1 to 4 carbon atoms.

The adhesive compositions embodying this invention desirably consist predominantly of a monomer of this formula and can include a small amount of a suitable polymerization inhibitor sufficient to impart improved shelf stability to the composition without adversely affecting its adhesive properties. The laminated articles prepared in accordance with this invention by spreading a thin film of the adhesive composition on at least one surface of the materials to be bonded, bringing the surfaces into contact, and polymerizing the adhesive composition, show excellent mechanical strength, and in most cases break in the material which is bonded before failure of the adhesive bond.

The monomeric material forming a major component of the adhesive compositions embodying this invention can be any of the monomers included within the formula set out. Thus the monomers can be α-alkylsulfonyl acrylonitriles such as α-methylsulfonyl-acrylonitrile, α-ethylsulfonylacrylonitrile, or the like; 1,1-bis (alkylsulfonyl) ethylenes such as 1,1-bis (methylsulfonyl) ethylene, 1,1-bis (isopropylsulfonyl) ethylene or the like; alkyl α-(alkylsulfonyl) vinyl sulfonates such as methyl α-(methylsulfonyl) vinyl sulfonate, butyl α-(methylsulfonyl) vinyl sulfonate and the like; alkyl α-(alkylsulfonyl) acrylates such as methyl α-(methylsulfonyl) acrylate, ethyl α-(methylsulfonyl) acrylate, butyl α-(methylsulfonyl) acrylate and the like; 1-acetyl-1-alkylsulfonyl ethylenes such as 1-acetyl-1-methylsulfonyl ethylene, 1-acetyl-1-isopropylsulfonyl ethylene, and the like; alkyl α-acetyl vinyl sulfonates such as methyl α-acetyl vinyl sulfonate and the like; dialkyl α-sulfoacrylates such as the α-methyl sulfonate of methylacrylate and the like; and similar monomeric materials coming within the scope of the formula $CH_2=CXY$.

These monomers can be prepared in any desired manner. A preferred method for preparing such monomers comprises reacting a material of the formula $CH_2XY$ with formaldehyde in aqueous or non-aqueous medium, whereby a low molecular weight polymer of the desired monomer is obtained. This polymer can then be depolymerized by pyrolysis preferably in the presence of a suitable polymerization inhibitor to give the desired monomeric material. This reaction is illustrated by the following equation:

$$CH_2O + CH_2XY \rightarrow (CH_2=CXY)_n \rightarrow CH_2=CXY$$

In preparing the monomers embodying this invention in accordance with this reaction, either formaldehyde or a polymer of formaldehyde such as p-formaldehyde can be used. The reaction can be effected using an aqueous solution of formaldehyde, such as the commerical product known as Formalin, which contains from 35 to 40 per cent by weight of formaldehyde dissolved in water. Desirably, however, the reaction is effected under non-aqueous conditions using an organic solvent as the reaction medium. In this way the water formed during the reaction is taken up in the solvent medium and can be removed from the reaction mixture by distillation of the solvent and the water in the form of an azeotrope. The solvent which is used can be an alcohol such as methanol, ethanol, isopropanol or the like; an aliphatic ether, and preferably a diakyl ether such as dimethyl ether, diethyl ether or the like; benzene, chloroform, cyclohexane, or similar well known organic solvent which distills below the depolymerization temperature of the polymeric material obtained in the initial reaction. It is desirable that the solvent used in the reaction contain a water-azeotrope forming solvent such as benzene, or that such a solvent be added to the reaction mixture prior to the separation of the water and solvent from the crude product before depolymerization. By azeotropic distillation, a polymeric product is obtained which contains less than about 0.4% of water, and which consequently can be more readily depolymerized than is the case with polymers containing higher amounts of water to give a monomeric product of improved stability against polymerization.

When the reaction is effected in aqueous medium, it is usually desirable to dry the crude polymeric product prior to depolymerization. This can be done in accordance with well known practice in a circulating air oven or the like. The crude polymeric product is then depolymerized by heating the polymer under reduced pressure, whereby monomer vapors are evolved which can be collected in a suitable cooled receiver. Usually a temperature of about 150–200° C. at a pressure of the order of 1 mm. Hg. is effective to cause depolymerization of the polymer. In order to avoid polymerization of the monomer which is formed, it is desirable to effect the depolymerization with an acidic polymerization inhibitor in the reaction vessel. This inhibitor is desirably phosphorous pentoxide, although other polymerization inhibitors such as antimony pentoxide, picric acid, t-butyl catechol or the like can be employed. Similarly, the monomer is desirably collected in a receiving vessel which contains a small amount of a polymerization inhibitor such as hydroquinone or other inhibitor. Best results are obtained by also introducing into the depolymerization system an acidic gaseous inhibitor which mixes with the monomeric vapors and is presently condensed with the vapors to give a monomer containing a small amount of such gaseous inhibitor dissolved therein. This gaseous inhibitor is desirably sulfur dioxide for best results, although nitric oxide can be used, as well as hydrogen fluoride or other acidic gaseous inhibitor. The monomeric compositions embodying this invention desirably include a polymerization inhibitor, whereby the composition has an extended shelf stability against auto-polymerization. In the preferred embodiment, sulfur dioxide is employed either alone or in combination with hydroquinone as the polymerization inhibitor. When the concentration of sulfur dioxide in the adhesive composition is kept in the range of from about 0.001% to about 0.01%, it is not necessary to remove the inhibitor before employing the adhesive composition for bonding in accordance with this invention. When higher amounts of sulfur dioxide are present, it is usually desirable to subject the adhesive composition to a reduced pressure in order to reduce the sulfur dioxide concentration to the preferred range before use. When hydroquinone is employed in conjunction with sulfur dioxide, its concentration is desirably maintained within the range of from about 0.001% to about 0.05% for best results.

An alternative method of preparing the monomers embodying this invention is illustrated by the following equation:

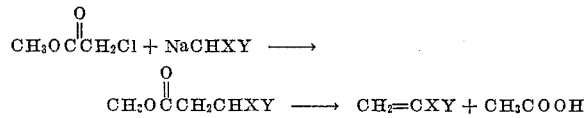

When this method is employed, it is not necessary to depolymerize the monomers, but it is necessary to separate the acetic acid formed during the reaction from the monomer.

The adhesive compositions prepared as described usually have melting points near or slightly above room temperature. In order to obtain good bonding action, the compositions are desirably heated above their melting point and applied in the molten state. When this is done and the composition is applied while warm, it is usually not necessary to heat the adhesive composition further during the bonding operation. Instead, the polymerization and bonding takes place within a period of from a few seconds to a few minutes without the use of a polymerization catalyst and without the application of additional heat or pressure to give a very strong, tenacious bond.

In the case of the high melting monomers, it may be desirable in some cases to incorporate from about 1 to about 10% of a plasticizer in the adhesive composition prior to use. Typical plasticizers which are suitable for use in these compositions include the cyanoacetic esters, succinate esters, phthalate esters, glycerol triacetate, glycerol tributyrate, acid-free esters of phosphoric acid, diethyl ethylphosphonate, sebacic acid esters and adipic acid esters. These and similar plasticizers facilitate the use of the adhesive compositions and also serve to protect the adhesive bond against undue brittleness after prolonged periods of aging.

The adhesive compositions of this invention can be used for bonding together glass, metal, plastics, rubber, wood, textile fabrics, paper, and many other porous and non-porous materials. The compositions can be used for adhering similar materials or dissimilar materials. Thus, for example, the materials being bonded can both be porous materials, or they can both be non-porous materials, or one can be a porous material and the other a non-porous material. The adhesive compositions are preferably employed in a fluid state so that the composition flows well over the surface to be bonded to give a relatively thin film of adhesive. Thick films of adhesive are not necessary and are usually less desirable because of a tendency to laminate in the bonding layer. In most cases, the monomer possesses sufficient viscosity under the conditions of use so that it is not necessary to incorporate a viscosity regulator into the composition. In those cases wherein the monomer is unduly fluid at room temperature, however, it may be desirable to incorporate up to about 25% by weight of a polymeric material which is soluble in the monomeric composition. Typical viscosity regulators include polymers of these monomers or of other materials such as polycyano acrylates, cellulose esters, or the like.

The adhesive compositions embodying the invention desirably contain a major amount of one or more of the monomers described herein. If desired, however, the adhesive composition can be a mixture of one or more of the monomers embodying this invention with another polymerizable monomer such as a neutral vinyl monomer, including the vinyl esters such as vinyl acetate, or a 1,1-cyanoethylene, a malono nitrile, or similar monomeric material. Since the polymerization is catalyzed by the presence of alkaline materials, the use of materials having an alkaline reaction is desirably avoided in order to obviate the possibility of premature polymerization of the adhesive compositions. Similarly, the presence of appreciable amounts of acidic materials should be avoided since materials of this kind adversely affect the polymerization rate. When bonding materials which have acidic surface characteristics, it may be desirable to wash the surface with a basic solution, or preferably with an alcohol, in order to achieve optimum bonding action. The adhesive compositions of this invention find utility in industrial as well as home applications. Thus they can be used in the fabrication of articles wherein it is desired to bond elements together in a rigid water-resistant assembly. Laminated glass and laminated plywood are readily prepared in accordance with this invention, and fibrous materials can be bonded to give a water-resistant laminate.

The invention is illustrated by the following examples of certain preferred embodiments thereof. It will be understood, however, that the examples are included merely for purposes of illustration and are not intended to limit the scope of the invention unless otherwise specifically indicated. Thus the compositions embodying this invention can include other monomers as described herein in addition to those illustrated in the examples.

*Example 1*

An adhesive composition comprising a monomer of the formula

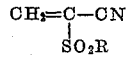

is illustrated by α-methylsulfonylacrylonitrile containing 0.001% sulfur dioxide. This composition was heated to 75° C. and, while warm, was used to form strong bonds between glass and glass, glass and metal, celluose acetate butyrate to itself, rubber to glass, and wood to wood. The bonds formed rapidly by merely spreading the warmed adhesive composition in a thin film on the surface to be bonded and bringing the surfaces into contact.

*Example 2*

An α-methylsulfonylacrylonitrile composition containing 3% by weight of methyl cyanoacetate as a plasticizer was heated to 75° C. and used in adhering glass to glass, metal to metal, plastic to plastic, rubber to glass, wood to wood, and the like. The bonds formed readily and had extremely good tensile strength.

Example 3

A compound of the formula

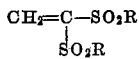

1,1-bis-(methylsulfonyl)ethylene containing 5% dimethylsuccinate was employed in accordance with the procedure of Example 1 to form strong bonds with various glass, metal, plastic, rubber and wooden objects.

Example 4

Methyl α-(methylsulfonyl) acrylate is an example of an adhesive comprising a material of the formula

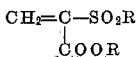

A mixture of this monomer and 0.002% sulfur dioxide was employed according to the process of Example 1 to form strong bonds between various glass, metal, wooden, plastic and film materials.

Example 5

Methyl α-(methylsulfonyl)vinyl sulfonate is a typical example of a monomeric adhesive of the formula

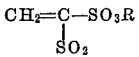

This monomer was employed to form excellent bonds between various glass, wooden, plastic and metal objects.

Example 6

1-acetyl-1-methylsulfonylethylene,

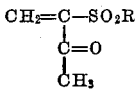

was used in accordance with the process described in Example 1 to form strong bonds between various glass, metal, plastic and wooden objects.

Example 7

Other monomeric compositions employed to form strong bonds between a variety of objects included α-ethylsulfonylcrylonitrile, 1,1 - bis (isopropylsulfonyl)-ethylene and butyl α-(methylsulfonyl)vinyl sulfonate.

Thus by means of this invention a highly useful group of adhesive compositions is provided. The compositions, when stabilized with a mixture of sulfur dioxide and hydroquinone, show excellent shelf stability and can be stored for prolonged periods of time. Despite this excellent stability in bulk, however, the compositions have the anomalous characteristic of polymerizing rapidly without the use of a catalyst when spread in a thin film which still contains the polymerization inhibitor. The compositions embodying the invention can be prepared either batchwise or by a continuous process. A continuous process is readily attained when a non-aqueous solvent such as ethanol is used as the reaction vehicle since the low molecular weight polymers which are obtained do not have to be isolated and dried, and melt readily at relatively low temperatures, so that they can be flowed into a depolymerization chamber from the reaction chamber in which they are formed. This makes possible the economical large-scale production of these adhesive compositions.

The invention has been described in considerable detail with particular reference to certain preferred embodiments thereof, but it will be understood that variations and modifications can be effected within the spirit and scope of the invention as described hereinabove, and as defined in the appended claims.

We claim:

1. An adhesive composition consisting predominantly of monomeric α-alkylsulfonyl acrylonitrile wherein the alkyl group contains from 1 to 4 carbon atoms.

2. An adhesive composition consisting predominantly of a monomer of the formula

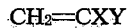

wherein X and Y are different radicals and X is a member of the group consisting of —SO₂R and —SO₃R radicals and Y is a member of the group consisting of —CN, —COOR, —COCH₃, —SO₂R and —SO₃R radicals, R being an alkyl group of from 1 to 4 carbon atoms, said composition including dissolved therein a stabilizing amount of sulfur dioxide as a polymerization inhibitor.

3. An adhesive composition comprising monomeric α-alkylsulfonyl acrylonitrile wherein the alkyl group contains from 1 to 4 carbon atoms, and sulfur dioxide dissolved in the monomer.

4. An adhesive composition consisting predominantly of monomeric alkyl α-(alkylsulfonyl) vinyl sulfonate wherein each alkyl group contains from 1 to 4 carbon atoms, said composition including a stabilizing amount of sulfur dioxide dissolved in the monomer.

5. An adhesive composition consisting predominantly of monomeric alkyl α-(alkylsulfonyl) acrylate wherein each alkyl group contains from 1 to 4 carbon atoms, said composition including a stabilizing amount of sulfur dioxide dissolved in the monomer.

6. An adhesive composition consisting predominantly of monomeric 1-acetyl-1-alkylsulfonyl ethylene wherein the alkyl group contains from 1 to 4 carbon atoms, said composition including a stabilizing amount of sulfur dioxide dissolved in the monomer.

7. The method of bonding two solid materials together which comprises applying to the surface of at least one of said materials a thin film of an adhesive composition comprising a monomer of the formula

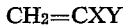

wherein X and Y are different radicals and X is a member of the group consisting of —SO₂R and —SO₃R radicals, and Y is a member of the group consisting of —CN, —COOR, —COCH₃, —SO₂R and —SO₃R radicals, R being an alkyl group of from 1 to 4 carbon atoms, bringing together the materials to be bonded, and polymerizing said thin film of said monomer while in contact with both of said materials.

8. The method of bonding together two solid materials, at least one of which is a non-porous material, which comprises applying to the surface of at least one of said materials a thin film of an adhesive composition comprising a monomer of the formula

wherein X and Y are different radicals and X is a member of the group consisting of —SO₂R and —SO₃R radicals, and Y is a member of the group consisting of —CN, —COOR, —COCH₃, —SO₂R and —SO₃R radicals, R being an alkyl group of from 1 to 4 carbon atoms, bringing together the materials to be bonded, and polymerizing said thin film of said monomer while in contact with both of said materials.

9. The method of bonding together two solid materials, at least one of which is a relatively porous material, which comprises applying to the surface of at least one of said materials a thin film of an adhesive composition comprising a monomer of the formula

wherein X and Y are different radicals and X is a member of the group consisting of —SO₂R and —SO₃R radicals, and Y is a member of the group consisting of —CN, —COOR, —COCH₃, —CO₂R and —SO₃R radicals, R being an alkyl group of from 1 to 4 carbon atoms, bringing together the materials to be bonded, and polymerizing said thin film of said monomer while in contact with both of said materials.

10. A laminated article comprising at least two solid members bonded together by a thin film of a polymerized monomer of the formula $$CH_2=CXY$$

wherein X and Y are different radicals and X is a member of the group consisting of —$SO_2R$ and —$SO_3R$ radicals, and Y is a member of the group consisting of —CN, —COOR, —$COCH_3$, —$SO_2R$ and —$SO_3R$ radicals, R being an alkyl group of from 1 to 4 carbon atoms.

11. A laminated article comprising two solid materials, at least one of said materials being a non-porous material, bonded together by a thin film of polymerized monomer of the formula $$CH_2=CXY$$

wherein X and Y are different radicals and X is a member of the group consisting of —$SO_2R$ and —$SO_3R$ radicals, and Y is a member of the group consisting of —CN, —COOR, —$COCH_3$, —$SO_2R$ and —$SO_3R$ radicals, R being an alkyl group of from 1 to 4 carbon atoms.

12. A laminated article comprising two solid materials, at least one of said materials being a relatively porous material, bonded together by a thin film of polymerized monomer of the formula $$CH_2=CXY$$

wherein X and Y are different radicals and X is a member of the group consisting of —$SO_2R$ and —$SO_3R$ radicals, and Y is a member of the group consisting of —CN, —COOR, —$COCH_3$, —$SO_2R$ and —$SO_3R$ radicals, R being an alkyl group of from 1 to 4 carbon atoms.

References Cited in the file of this patent

UNITED STATES PATENTS

| | | |
|---|---|---|
| 2,097,263 | Strain | Oct. 26, 1937 |
| 2,232,785 | Howk | Feb. 25, 1941 |
| 2,485,294 | Kropa | Oct. 18, 1949 |
| 2,641,594 | Barney | June 9, 1953 |
| 2,675,371 | Coover et al. | Apr. 13, 1954 |